(12) United States Patent
Li et al.

(10) Patent No.: US 9,258,818 B2
(45) Date of Patent: Feb. 9, 2016

(54) CARRIER ALLOCATION IN WIRELESS NETWORK

(75) Inventors: Zexian Li, Espoo (FI); Padam Kafle, Coppell, TX (US)

(73) Assignee: Nokia Technologies OY, Espoo (FI)

( * ) Notice: Subject to any disclaimer, the term of this patent is extended or adjusted under 35 U.S.C. 154(b) by 332 days.

(21) Appl. No.: 13/641,474

(22) PCT Filed: Apr. 29, 2010

(86) PCT No.: PCT/IB2010/000974
§ 371 (c)(1),
(2), (4) Date: Oct. 16, 2012

(87) PCT Pub. No.: WO2011/135392
PCT Pub. Date: Nov. 3, 2011

(65) Prior Publication Data
US 2013/0156005 A1    Jun. 20, 2013

(51) Int. Cl.
H04W 36/06        (2009.01)
H04W 72/04        (2009.01)
H04L 5/00         (2006.01)
H04L 27/00        (2006.01)
H04W 16/14        (2009.01)

(52) U.S. Cl.
CPC .......... *H04W 72/0453* (2013.01); *H04L 5/001* (2013.01); *H04L 5/0041* (2013.01); *H04L 5/0064* (2013.01); *H04L 5/0087* (2013.01); *H04L 5/0096* (2013.01); *H04L 27/0006* (2013.01); *H04W 36/06* (2013.01); *H04W 16/14* (2013.01); *H04W 72/0406* (2013.01)

(58) Field of Classification Search
USPC ........................................ 370/331, 335, 311
See application file for complete search history.

(56) References Cited

U.S. PATENT DOCUMENTS

| | | | |
|---|---|---|---|
| 2005/0180374 A1* | 8/2005 | Balachandran et al. | 370/343 |
| 2006/0209748 A1* | 9/2006 | An et al. | 370/328 |
| 2007/0280217 A1* | 12/2007 | Flanagan et al. | 370/356 |
| 2009/0163158 A1 | 6/2009 | Chitrapu et al. | |
| 2011/0085441 A1* | 4/2011 | Poonawalla et al. | 370/228 |
| 2011/0086662 A1* | 4/2011 | Fong et al. | 455/517 |
| 2011/0110337 A1* | 5/2011 | Grant et al. | 370/335 |
| 2013/0064156 A1* | 3/2013 | Park et al. | 370/311 |

OTHER PUBLICATIONS

Brik Vet Al: "DSAP: a protocol for coordinated spectrum access", 2005.*
International Search Report of PCT/IB2010/000974 dated Jan. 18, 2011.
Ghos, C., Si Chen, Agrawal, D.P., Wyglinski, A.M., "Priority-based spectrum allocation for cognitive radio networks employing NC-OFDM transmission." Military Communications Conference, 2009. Milcom 2009. IEEE, Vol., No., pp. 1-5, Oct. 18-21, 2009 abstract.

(Continued)

*Primary Examiner* — Dang Ton
*Assistant Examiner* — Pamit Kaur
(74) *Attorney, Agent, or Firm* — Banner & Witcoff, Ltd.

(57) ABSTRACT

This document presents a communication scheme for use in a wireless network utilizing a fragmented frequency spectrum and supporting dynamic radio carrier allocation. At least two radio carriers on non-contiguous frequency channels are allocated for use in communication with a network element of the wireless network, and one of the allocated radio carriers is commonly used by all client stations communicating with the network element.

23 Claims, 4 Drawing Sheets

(56) References Cited

OTHER PUBLICATIONS

Guangxiang Yuan, Xiang Zhang, Wenbo Wang, Yang Yang, "Carrier aggregation for LTE-advanced mobile communiction systems," Communications Magazine, IEEE, vol. 48, No. 2, pp. 88-93, Feb. 2010, Section—Control Signaling Design.

Ian F. Akyildiz, W., Y. Lee, M.C. Vuran and S. Mohanty, "NeXt Generation/Dynamic Spectrum Access/Cognitive Radio Wireless Networks: A Survey," Computer Networks (Elsevier) Journal, Sep. 2006. Retrieved from http://www.ece.gatech.edu/research/labs/bwn/surveys/radio.pdf, whole document.

European Search Report dated Aug. 8, 2013 of EP10850616.

Brik V et al: DSAP: A Protocol for Coordinated Spectrum Access', 2005 1st IEEE International Symposium on New Frontiers in Dynamic Spectrum Access Networks, IEEE, Baltimore, MD, USA, (Nov. 8, 2005), Whole Document.

Motorola: "Comparison of PDCCH Structures 1-13 for Carrier Aggregation", 3GPP Draft; R1-091326, 3rd, Mobile Competence Centre; 650, Route Des Lucioles; F-06921 Sophia-Antipolis Cedes; France, Mar. 18, 2009, p. 1 and 3.

\* cited by examiner

CARRIER ALLOCATION IN WIRELESS NETWORK

FIELD

The invention relates to the field of radio telecommunications and, particularly, to communication between a network element and client stations in a wireless network.

BACKGROUND

Modern wireless telecommunication systems aim to efficient utilization of the available frequency spectrum so as to maximize capacity and throughput. Multiple systems or subsystems may even be allocated to share a common frequency band which is shared in a dynamic manner between the systems. Such a spectrum utilization may result in a fragmented frequency spectrum, where free frequency channels available for a network element of one of the systems are scattered with reserved frequency channels being allocated between the available frequency bands.

BRIEF DESCRIPTION

According to an aspect of the present invention, there is provided a method comprising selecting, in a network element of a wireless network employing dynamic radio carrier allocation, at least two radio carriers on non-contiguous frequency channels for utilization in communication with the network element, wherein all stations communicating with the network element utilize in the communication with the network element at least one same radio carrier amongst the at least two radio carriers. The method further comprises causing transmission of a signal carrying information about the selected radio carriers to a radio channel, receiving an association request from a client station, wherein the association request comprises a message indicating a capability of the client station to operate the selected at least two radio carriers in communication with the network element, and configuring a communication link between the network element and the client station to utilize at least one of the at least two selected radio carriers on non-contiguous frequency channels on the basis of the received association request.

According to another aspect of the present invention, there is provided a method comprising receiving, in a client station from a network element of a wireless network employing dynamic radio carrier allocation, a signal carrying information about at least two radio carriers on non-contiguous frequency channels allocated to communication with the network element. The method further comprises causing transmission of an association request to the network element, wherein the association request comprises a message indicating capability of the client station to operate the selected at least two radio carriers in communication with the network element, receiving an association response message from the network element, wherein the association response message allocates at least one of the at least two radio carriers on non-contiguous frequency channels for communication between the client station and the network element, and communicating with the network element on at least one radio carrier amongst the at least two radio carriers which radio carrier is commonly used by all stations communicating with the network element.

According to another aspect of the present invention, there is provided an apparatus comprising at least one processor and at least one memory including a computer program code, wherein the at least one memory and the computer program code are configured, with the at least one processor, to cause the apparatus to: select at least two radio carriers on non-contiguous frequency channels for utilization in communication with a network element of a wireless network employing dynamic radio carrier allocation, wherein all stations communicating with the network element utilize in the communication with the network element at least one same radio carrier amongst the at least two radio carriers; cause transmission of a signal carrying information about the selected radio carriers to a radio channel; receive an association request from a client station, wherein the association request comprises a message indicating a capability of the client station to operate the selected at least two radio carriers in communication with the network element; and configure a communication link between the network element and the client station to utilize at least one of the at least two selected radio carriers on non-contiguous frequency channels on the basis of the received association request.

According to another aspect of the present invention, there is provided an apparatus comprising at least one processor and at least one memory including a computer program code, wherein the at least one memory and the computer program code are configured, with the at least one processor, to cause the apparatus to: receive, from a network element of a wireless network employing dynamic radio carrier allocation, a signal carrying information about at least two radio carriers on non-contiguous frequency channels allocated to communication with the network element, in which wireless network all stations communicating with the network element utilize in the communication with the network element at least one same radio carrier amongst the at least two radio carriers, cause transmission of an association request to the network element, wherein the association request comprises a message capability of the client station to operate the selected at least two radio carriers in communication with the network element, receive an association response message from the network element, wherein the association response message allocates at least one of the at least two radio carriers on non-contiguous frequency channels for communication between the client station and the network element.

According to yet another aspect of the present invention, there is provided a computer program product embodied on a computer-readable distribution medium configuring a processor to carry out any one of the above-mentioned methods.

According to yet another aspect of the present invention, there is provided an apparatus comprising means for carrying out any one of the above-mentioned methods.

According to yet another aspect of the present invention, there is provided an apparatus comprising a communication circuitry configured to select at least two radio carriers on non-contiguous frequency channels for utilization in communication with a network element of a wireless network employing dynamic radio carrier allocation, wherein all stations communicating with the network element utilize in the communication with the network element at least one same radio carrier amongst the at least two radio carriers to cause transmission of a signal carrying information about the selected radio carriers to a radio channel, to receive an association request from a client station, wherein the association request comprises a message indicating a capability of the client station to operate the selected at least two radio carriers in communication with the network element, and to configure a communication link between the network element and the client station to utilize at least one of the at least two selected radio carriers on non-contiguous frequency channels on the basis of the received association request.

According to yet another aspect of the present invention, there is provided an apparatus, comprising a communication circuitry configured to receive, from a network element of a wireless network employing dynamic radio carrier allocation, a signal carrying information about at least two radio carriers on non-contiguous frequency channels allocated to communication with the network element, in which wireless network all stations communicating with the network element utilize in the communication with the network element at least one same radio carrier amongst the at least two radio carriers, cause transmission of an association request to the network element, wherein the association request comprises a message indicating a capability of the client station to operate the selected at least two radio carriers in communication with the network element, and receive an association response message from the network element, wherein the association response message allocates at least one of the at least two radio carriers on non-contiguous frequency channels for communication between the client station and the network element.

Embodiments of the invention are defined in the dependent claims.

LIST OF DRAWINGS

Embodiments of the present invention are described below, by way of example only, with reference to the accompanying drawings, in which FIG. 1 illustrates a communication scenario to which embodiment of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
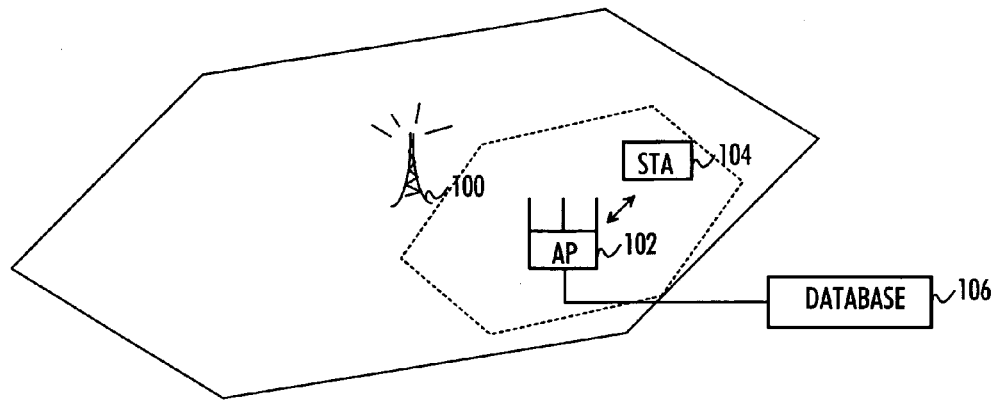

A general communication scenario to which embodiments of the present invention may be applied is illustrated in FIG. 1. Referring to FIG. 1, at least two systems are located such that their coverage areas overlap at least partly and that they are configured to operate on a common frequency band. A first system may be a television (TV) broadcast system comprising a broadcast tower 100 broadcasting television channels on some channels of the common frequency band. A second system may be a bidirectional wireless network comprising a network element 102 as an access point providing a client station 104 with bidirectional wireless communication services. The wireless network may also utilize frequency channels on the common frequency band.

For example, the Federal Communications Commission (FCC) in the United States has issued a report and order (R&O) which permits the use of TV white space (TV WS) spectrum. White space is the term used by the FCC for a TV spectrum which is not being occupied for primary usage e.g. by the TV or wireless microphone transmitters. The wireless network comprising the network element 102 may be configured to utilize available frequency bands of such a spectrum having a frequency band on a very high frequency band (VHF, 30 to 300 MHz), ultra-high frequency band (UHF, 300 to 3000 MHz), and/or other frequency bands. The wireless network may be based on the IEEE 802.11 standard also known as WLAN (Wireless Local Area Network) and Wi-Fi. However, the wireless network is not limited to the IEEE 802.11 network and it may be any other wireless network within the scope of the present claims. The first (primary) system also need not be a TV broadcast or a wireless microphone transmitter system either, and it may be any other system having a frequency band that may be shared with the wireless network and that may become fragmented through the frequency utilization of the first system. In some embodiments, the first system is a primary system having a priority over the frequency bands. The wireless network may then be configured to dynamically adapt to the spectrum utilization of the primary system and occupy a frequency band not used by the primary system in a given geographical area. In the following description, let us refer to the first system as the primary system and to the wireless network as the secondary system.

There may exist rules for the secondary system to ensure minimization/lack of interference towards the primary system, and these rules may require access to information on free frequency bands in each geographical area and/or sensing and use of specified maximum transmit power levels. Such information on the free frequency bands may be stored in a database 106 to which the network element 102 has access. The network element 102 may obtain the information on the free frequency channels indirectly through any other node that has access to the database 106. An operator of the primary system may update in the database 106 as the channel allocation of the primary system changes, and the network element 102 may periodically (or constantly) monitor the database 106 for an updated channel allocation and take measures to adjust its own frequency allocation accordingly. Similarly, the database may store maximum transmit power limits that the network element may not exceed so as not to interfere with the users of the primary system.

Figure 2:
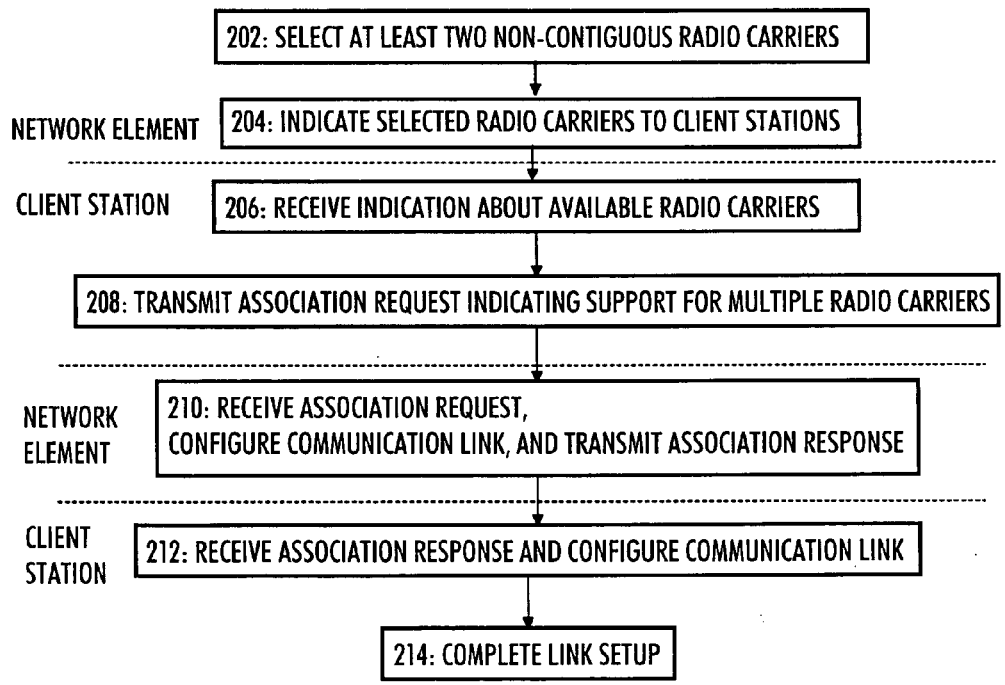
FIG. 2 illustrates a process for initializing communications in a network element apparatus and a client apparatus of a wireless network according to an embodiment of the invention.

FIG. 2 illustrates a general process for setting up communications in the secondary system comprising the network element 102 and at least one client station 104. The process of FIG. 2 actually comprises two separate setup processes: one carried out in the network element 102 (steps 202, 204, 210, and 214) and one carried out in the client station 104 (steps 206, 208, 212, and 214). Both processes may be computer program processes configuring the apparatus in question (network element, the client station, or a chipset of one of them) to carry out the corresponding steps so as to set up the communications in the secondary system according to an embodiment of the invention.

Referring to FIG. 2, the network element selects in step 202 at least two radio carriers on non-contiguous frequency channels for utilization in communication. Prior to selection and use of more than one radio frequency (RF) carriers for communication, the network element may initiate its network with only one RF carrier, and the latter may add one or more RF carriers for use on the basis of the frequency channel availability. The network element may read from the database at least two available frequency channels, wherein at least two of the frequency channels are on non-contiguous frequency bands, i.e. there is at least one primary system band between the non-contiguous frequency bands. Upon detection of the at least two available frequency channels, the network element determines the at least two radio carriers corresponding to the available frequency channels, e.g. the frequencies of the radio carriers are center frequencies of the available frequency channels. The number of frequency channels and radio carriers the network element selects may be based on the number of available frequency channels (if that is a limiting factor), the maximum capacity currently required from the network element, or some other criteria. Some of the frequency channels may be contiguous, but in an embodiment at least two of the selected frequency channels are on non-contiguous frequency channels.

In step 204, the network element indicates the selected radio carriers to the client stations by causing transmission of a signal carrying information about the selected radio carriers to a radio channel. The signal may be a broadcast signal broadcasted by the network element, e.g. a beacon signal, or it may be a unicast or a multicast signal addressed to the client station (unicast) or multiple client stations (multicast).

In step 206, the client station receives the signal carrying information about at least two radio carriers from the network element. The signal indicates the radio carriers currently available for use in communication with the network element 102. Step 206 may be followed by an authentication procedure where the network element and the client station authenticate their identities. In step 208, the client station causes transmission of an association request to the network element, wherein the association request comprises a message indicating the capability of the client station of operating the selected at least two radio carriers in communication with the network element. The association request may also be a reassociation request where the client station requests for reassociation of communication parameters. The association request may be as specified for an IEEE 802.11 system, or it may be another message that comprises the message indicating capability of the client station of operating the selected at least two radio carriers in communication with the network element. If the client station does not support simultaneous operation on multiple non-contiguous frequency bands, the client station indicates in the message the capability to operate only a single radio carrier. On the other hand, if the client station supports simultaneous operation on multiple non-contiguous frequency bands, the client station may indicate in the message the number of different radio carriers on non-contiguous frequency bands it supports, and optionally the preference or decision to use one or more of the available radio carriers. The association request may be transmitted in response to reception of a request for establishing a network access from a higher level application, e.g. a web browser, launched in the client station. Any other message or frame may be utilized to indicate the capabilities and preferences of the client station instead of association or re-association request frames.

In step 210, the network element receives the association request from the client station, wherein the association request comprises the message indicating the capability of the client station of operating the selected at least two radio carriers in communication with the network element. In response to the reception of the association request, the network element configures a communication link between the network element and the client station to utilize at least one of the at least two selected radio carriers on non-contiguous frequency channels on the basis of the received association request. For example, if the association request indicates that the client station supports communication on one contiguous frequency band only, the network element allocates one of the available radio carriers for use in communication with the client station. In the secondary system, all stations communicating with the network element according to the same radio standard utilize, in the communication with the network element, at least one same radio carrier amongst the at least two radio carriers. Such a common radio carrier is called a principal radio carrier, and all client stations communicating with the network element according to the same radio communication technology utilize at least the principal radio carrier in the communication. With WLAN terminology, the same radio carrier is used by all stations belonging to a basic service set (BSS). The basic service set is a set of all stations that can communicate with the network element, including the network element itself. The basic service set may comprise a fixed infrastructural access point (base station) and client stations, or the basic service set may be an independent basic service set without the fixed infrastructure where one of the client stations operates as a master device or is able to receive the information of the available frequency channels indirectly through any other node that has access to the database, and has the functionality to control wireless communications in the basic service set. In another embodiment, some (not all) of the client stations communicating with the network element utilize, in the communication with the network element, at least one same radio carrier amongst the at least two radio carriers.

Then, the network element allocates at least the principal carrier and, additionally, at least one other radio carrier to the client station, if the client station supports multiple radio carriers on non-contiguous frequency bands. Furthermore, the network element causes transmission of an association response message comprising an information element indicating the radio carriers allocated to the client station in step 210. In step 212, the client station receives the association response message and configures its radio interface components to operate on the allocated radio carriers. In step 214, the link setup is completed with respect to other link setup functionalities common to the link setup, which are not discussed here in greater detail. Step 214 may include functionalities in the network element and/or in the client station.

The embodiment of FIG. 2 enables efficient utilization of a fragmented frequency spectrum for a secondary system where all stations communicating with the network element utilize at least one same radio carrier amongst the at least two radio carriers. The fragmented frequency spectrum may be exploited by providing support for multi-carrier communication on non-consecutive frequency channels in order to increase throughput and capacity. Term "multi-carrier" in this context should be understood to refer to a scheme where each carrier is on a non-contiguous frequency band with respect to other carriers of the same basic service set. In other words, each radio carrier is a main carrier whose frequency defines the center frequency of the frequency channel. A radio access technology utilized for each radio carrier may depend on the implementation, e.g. a multi-carrier scheme where each radio carrier carries multiple sub-carriers such as orthogonal frequency division multiplexing (OFDM), multi-carrier code division multiple access (MC-CDMA), and MC direct sequence CDMA (MC-DS-CDMA).

Figure 3:
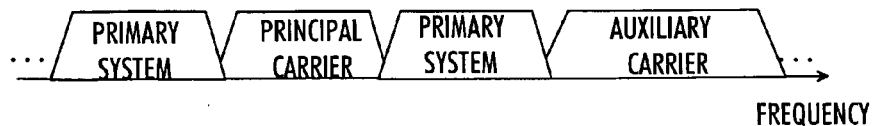
FIG. 3 illustrates frequency spectrum utilization according to embodiments of the invention.

FIG. 3 illustrates an example of fragmented spectrum utilization that the secondary system according to embodiments of the invention utilizes. As mentioned above, the primary system may have the priority to occupy any sub-band within its operating frequency band regardless of whether it is currently free or used by the secondary system. These frequency bands are denoted as "primary system" in FIG. 3. The remaining frequency bands that may be referred to as the TV white space, if the primary system is the TV broadcast system, may then be occupied by the secondary system. As mentioned above, the network element may check the database for the available frequency bands. The database may be maintained in a network of the operator of the primary system or a regulator, and the connection between the network element and the database may be established through the Internet in a wired and/or wireless manner, for example. In another embodiment, an authorized master device or node with database access capability controls the initialization of the network element 102, and the network element requests the setup parameters (including the radio carrier allocation) from its controller. In yet another embodiment, the network element scans the frequency band for free frequency channels. If the network element does not detect a signal on a given frequency channel within a given time duration, it assumes that the frequency channel is free for utilization. If the network element operates as a master for one or more neighboring network elements (access points), the network element may carry out the frequency channel allocation for the neighboring elements as well. Preferably, the network element assigns different frequency channels to network elements that belong to different basic service sets.

Upon selecting the frequency channels, the network element assigns one or more of the selected frequency channels to form the principal channel of the secondary system, i.e. the radio carrier of the principal frequency channel is a principal radio carrier. The principal RF carrier might be chosen to occupy two or more adjacent frequency channels based upon the availability or its requirements. The rest of the selected channels from the contiguous or non-contiguous frequency channels form the auxiliary channels. Multiple channels may be combined to form a principal or an auxiliary channel. Let us consider an example where primary system channel numbers 22, 24 and 25 (each having 5 MHz bandwidth) are available for use by the secondary system. Then, the secondary system may utilize channel 22 to transmit/receive a 5 MHz signal in a first RF carrier, and simultaneously use combined bandwidth of channels 24 and 25 to transmit/receive a 10 MHz signal in a second RF carrier. Further, if channel numbers 19 to 22 are available for use by the secondary system, the transceivers in the basic service set may combine the channels 19 to 22 into a single 20 MHz channel and the channels 24 and 25 into a single 10 MHz channel. The invention is not limited to 5 MHz channels of the primary system, and each primary system channel may have another value, or even different channels may have different bandwidths. The number of non-contiguous channels in the basic service set is not limited to two, and the number of channels used in the basic service set and how they are constructed (through combining) may be three, four, or even higher, as deemed necessary. Further, the channels in the basic service set may be located on non-contiguous and contiguous channels. For example, in the case where channels 19 to 22, 24, and 25 are available, the channels may be used to form three 10 MHz channels where two channels/carriers are on contiguous bands, while the third is on a non-contiguous band with respect to these two. The channels may in all embodiments be assigned to be principal/auxiliary channels according to the specifications of the secondary system.

The principal channel may be distinguished from the auxiliary channel(s) by a different physical layer design. For example, the principal channel may be configured to transfer more control information than the auxiliary channels. In an embodiment, all the acknowledgment messages are transferred on the principal channel, including the acknowledgment messages for packet data units transferred on the auxiliary channel(s). The principal channel may be selected according to a determined criterion. In order to facilitate the synchronization of the client stations with the principal channel, the location of the principal channel may be fixed with respect to the location of the auxiliary channels in the frequency spectrum, e.g. the principal channel is the lowest or the highest one of the selected frequency channels. The network element may transmit on each radio carrier a message indicating whether the radio carrier is the principal carrier or the auxiliary carrier, and it may also include the additional white space information about all available frequency channels in the frequency bands not occupied by the primary system, thus enabling the client stations receiving the message to identify the principal and auxiliary radio carriers and associated frequency channels. The white space information can be used to reduce latency during scanning of the available frequency channels, handover etc. The network element may be configured to transmit such a message at a beaconing interval when the network element broadcasts beacon frames containing information on the presence of the network element and on the secondary system, e.g. regulatory class and channel numbers selected for the basic service set. In another embodiment, the network element is configured to transmit such a message in response to a reception of a request message, such as a probing request, where a client station requests the network element to transmit relevant parameters on the secondary system. The message may then be contained in a probe response frame transmitted by the network element and received by the requesting client station. In another embodiment, the principal and auxiliary channels may be distinguished implicitly by a different physical layer design. For example, a distinct preamble may be defined for the principal and auxiliary channels, wherein the distinct preamble is transmitted for physical layer packet data units of the beacon or other frames over these RF carriers. In such a case, a specific information element indicating the principal/auxiliary channel may be excluded from the beaconing frame. The different design may apply to the physical layer packet data unit (PDU, data frame) format, wherein the PDU format is different for the principal and auxiliary channels. In yet another embodiment, the network element indicates the location of the principal channel in a message transmitted on at least one of the auxiliary channels and, optionally, on all auxiliary channels. Upon reception of the message on the auxiliary radio carrier, the client station determines the principal radio carrier on the basis of the message received on the auxiliary radio carrier. Similarly, the network element may indicate the location of the auxiliary channel(s) in a message transmitted on the principal channel. Upon reception of the message on the principal radio carrier, the client station determines the auxiliary radio carrier(s) on the basis of the message received on the auxiliary radio carrier. This reduces the scanning time of the client station, as the client station is able to determine the location of other channels upon detection of one channel.

The bandwidth of each RF carrier can be different, for example, it may be 5, 10, or 20 MHz, and can thus occupy one or more frequency channels. In an embodiment, the beacon frames are transmitted on the frequency channel having the lowest bandwidth amongst the frequency channels selected for the basic service set. This further reduces the scanning time of the client stations. The frequency channel used for broadcasting the beacon frames may be the principal channel.

In yet another embodiment, the scanning time for network discovery may be reduced further in a case where the client station comprises a plurality of radio interfaces providing a capability of scanning multiple frequency channels in parallel. The network element may transmit the beacon signals on different frequency channels with different offsets. For example, if the beacon signals are transmitted on three frequency channels selected for the basic service set with 100 ms intervals, the principal channel may transmit the beacon signal with 0 ms offset, a first auxiliary channel may transmit the beacon signal with 33 ms offset, and a second auxiliary channel may transmit the beacon signal with 66 ms offset (any other offset values are also possible). This increases the probability of discovering at least one of the selected frequency channels when using parallel frequency scanning.

With respect to the scanning procedure of the client station, the client station may start the scanning from the lowest frequency channel or from a frequency channel which has been used previously as the principal channel, the latter expediting network re-entry. The client station may only use the frequency channels listed in the white space information transmitted from the network element to determine all possible channel widths of the radio signals in one or all RF carriers. If no principal channel is detected, the client station may attempt to scan a frequency channel previously which has been used previously as the auxiliary channel. Upon detection of the principal carriers on the basis of a beaconing frame or probe request received on the principal (or auxiliary) channel, the client station may start the network entry procedure as described above.

As the secondary system operates the frequency channels primarily available for use by the primary system having the priority for channel assignments, situations may exist where the primary system unexpectedly occupies the principal channel, and the secondary system has to release the principal channel immediately without carrying out a controlled transfer of the principal channel. The release may be triggered in the network element upon reception of a release command from an authorized master device or node or upon detection of interference from the primary system in the radio interface. The interference may be detected on the basis of channel sensing performed by the network element itself or by the client stations configured to report channel sensing measurement reports to the network element. When the principal channel is abruptly released, the connections between the network element and the client stations may be dropped as a consequence of the release of the principal channel which is a common communication channel to all client stations. In an embodiment, the network element assigns one of the auxiliary channels or any other free frequency channel as a backup principal channel, and the message about the backup principal channel may be transmitted in the beacon frames on the principal channel and/or on the auxiliary channel operating as the backup principal channel. Upon detection of the release of the principal channel, the client stations may immediately set up the backup principal channel to be the new principal channel. In another embodiment, upon detection of a required release of the principal channel within a preset channel transition time (e.g. 2 s), the network element may transmit on the principal channel a principal channel transition message indicating the release of the principal channel and the frequency channel of the new principal channel. In response to the reception of such a message, the client stations may start the adjustment for setting up the new principal channel.

Figure 5A:
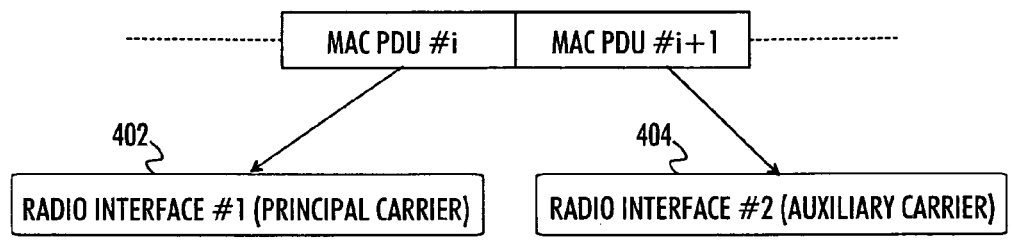
FIGS. 5A and 5B illustrate packet data unit allocation according to embodiments of the invention.

Next, let us consider data transmission in the secondary system according to embodiments of the invention. With respect to transmitting a signal on a plurality of non-contiguous frequency channels/carriers, a separate Medium Access Control (MAC) entity may control the transmission on each frequency channel. With respect to transmission, a higher layer segments data into MAC packet data units (PDUs) and inputs the PDUs to different MAC entities according to the capacity and/or bandwidth of the corresponding frequency channel, buffer status of MAC entities, etc. Each MAC entity is responsible for transmitting the MAC PDU received from the higher layer through the frequency channel allocated to the MAC entity. Referring to FIG. 5A, MAC PDU #i is handled by a first MAC entity, and it forwards the MAC PDU to a first radio interface 402 communicating on a principal carrier. MAC PDU #i+1 is handled by a second MAC entity, and it forwards the MAC PDU to a second radio interface 404 communicating on an auxiliary carrier. On the receiver side, each MAC entity receives MAC PDUs from a dedicated frequency carrier and forwards the received MAC PDUs to the higher layer which aggregates the MAC PDUs received from different MAC entities.

Figure 4:
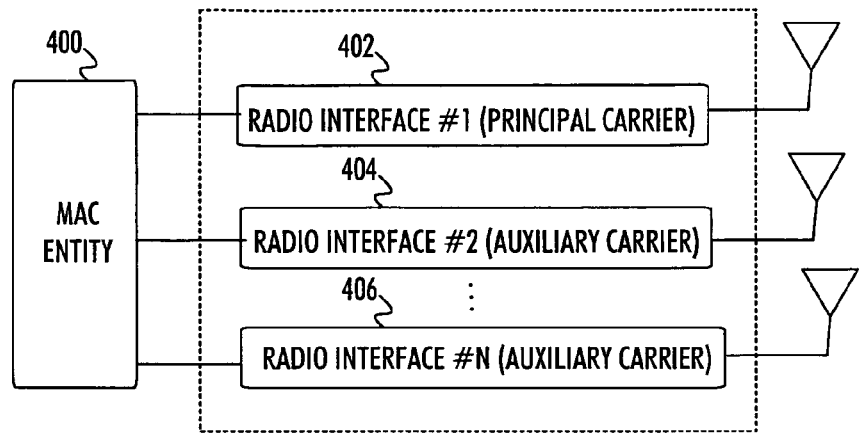
FIG. 4 illustrates a communication apparatus according to an embodiment of the invention.
Figure 5B:
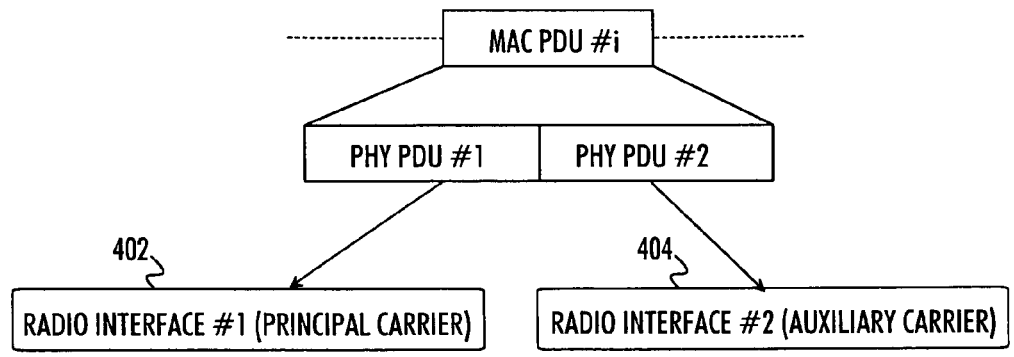

In another embodiment, a common MAC entity controls the transmission of the MAC PDUs over a plurality of frequency channels. Referring to FIG. 4, each radio interface 402, 404, 406 is tuned to a different frequency channel, and the MAC entity 400 may assign the MAC PDUs to different frequency channels by inputting the MAC PDUs to the corresponding radio interfaces 402 to 406. Each radio interface 402 to 406 then processes the received MAC PDUs into physical layer PDUs and transmits the physical layer PDUs into the radio channel. The common MAC entity 400 may utilize the transmission scheme of FIG. 5A where each MAC PDU is assigned to one radio interface, and the radio interface is responsible for transmitting the whole MAC PDU. Each RF carrier (principal or auxiliary carriers) can be used to transmit an aggregated MAC PDU (A-MPDU) or a single MAC PDU as determined by the common MAC entity. In another embodiment, the MAC entity 400 segments the MAC PDU into a plurality of physical layer PDUs (see FIG. 5B), and inputs the physical layer PDUs to different radio interfaces 402, 404. Each physical layer PDU is naturally provided with an identifier which enables aggregation of the physical layer PDUs into MAC PDUs in the receiver. The receiver receives the physical layer PDUs from different radio interfaces and aggregates the received PDUs into MAC PDUs. The MAC entity 400 may be configured to receive acknowledgment messages only from the first radio interface 402 tuned to the principal channel, which may include the acknowledgement for a fragment of a MAC PDU sent on other RF carriers as well. Upon reception of the acknowledgment message for all fragments of a given MAC PDU, the MAC entity assembles the MAC PDU from the received physical layer PDUs. In another embodiment, the receiving MAC entity may first attempt to aggregate the received physical layer PDUs into a MAC PDU, check whether the MAC PDU is received correctly, and transmit positive (ACK) or negative (NAK) acknowledgment messages for the MAC PDU to the transmitter. Upon reception of an ACK, the transmitting MAC entity terminates the automatic repeat request (ARQ) process for that MAC PDU, and upon reception of a NAK or in the absence of any ACK within the expected duration, the transmitting MAC entity retransmits the MAC PDU through the same radio interfaces or through different radio interfaces. The same principals for first aggregating and then acknowledging may be applied to multiple MAC PDUs. The receiving MAC entity may perform reception processing for multiple MAC PDUs and, then, acknowledge the correct/incorrect transmission of the multiple MAC PDUs (or aggregated MAC PDU) in a block ACK frame transmitted as feedback to the transmitting MAC entity. The aggregated MAC PDU may comprise all MAC PDUs transmitted on the same frequency channel at the same transmission time interval or, more generally, all MAC PDUs transmitted on different frequency channels (principal and one or more auxiliary channels) at the same transmission time interval.

This embodiment (FIG. 5B) enables flexible utilization of available resources on the principal and auxiliary channels, as the PDU sizes may be reduced when necessary. In an embodiment, the common MAC entity utilizes both above-mentioned schemes (FIGS. 5A and 5B) adaptively according to a determined criterion on the basis of traffic load, channel congestion, etc.

Figure 6:
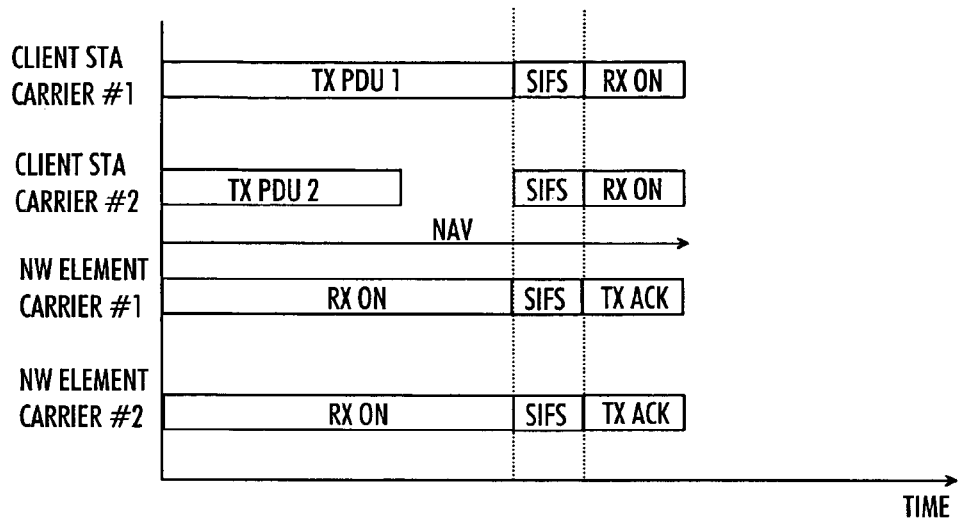
FIG. 6 illustrates time-aligned communication on a plurality of non-contiguous carriers according to an embodiment of the invention.

Referring to FIG. 4, each radio interface 402 to 406 may use different radio interface components, but in an embodiment at least the antenna is common to all radio interfaces 402 to 406. When the antenna is common to all radio interfaces, the transmission reception timings of the radio interfaces may be aligned so that all radio interfaces transmit/receive simultaneously. FIG. 6 illustrates an embodiment of time-aligned uplink transmission on two radio carriers from the client station (transmitter) to the network element (receiver). The MAC entity may schedule MAC PDUs to the radio interfaces according to the bandwidth used for each frequency channel and the expected transmission duration which can be estimated based on MAC PDU sizes, bandwidth and modulation, coding scheme level, etc. Different physical layer data rates (defined by the modulation and coding schemes, for example) can be used to transmit payload data through different RF carriers. Aggregated MAC PDUs may be used on a channel which has a higher data rate, while a single MAC PDU may be transmitted on a channel having a lower data rate. Before attempting a transmission, the client station may carry out channel sensing (physical and virtual carrier sensing) for principal (and optionally physical carrier sensing on auxiliary) channel(s), and if the channel(s) are detected to be free for use, the client station carries out the transmission. In another embodiment, the client station requests for transmission from the network element by transmitting a Request to Send (RTS) message. If the channel is free, the network element returns a Clear to Send (CTS) message. Upon determining that the channel is free for transmission, the MAC entity may set the frame length according to the time required to transmit the principal channel PDU. Accordingly, the time required to transmit the PDUs on the auxiliary carrier(s) is shorter than the transmission time of the PDU(s) on the principal carrier, as shown in FIG. 6. Then, the client station transmits and the network element receives the PDUs on the two carriers. Although the transmission on the carrier #2 stops before the transmission on the carrier #1 is completed, the frequency channel of the carrier #2 may still be reserved through a NAV setting in the basic service set (known as such from IEEE 802.11 networks). Instead of the NAV setting, the client station may generate void physical layer PDUs to fill the transmission time on the carrier #2. After the transmission is completed, a short inter-frame period (SIFS) is applied before the network element transmits acknowledgment messages for the PDUs on both carriers. The acknowledgments may, however, be sent on the principal carrier only, as mentioned above. There is no need to acknowledge void frames, if such are used. A similar transmission scheme may be applied to downlink as well. FIG. 6 illustrates that the network element ceases the reception for the duration of the transmission of the acknowledgments. In other embodiments, the network element may carry out the reception at the same time with the transmission, i.e. the network element may receive on one channel/carrier while it transmits on another channel/carrier.

With respect to the time-aligned transmission, the principal channel may utilize Enhanced Distributed Channel Access (EDCA), where higher priority traffic (such as voice and video) is assigned with higher priority access categories for transmission than low priority traffic, which is realized by configuring a station with high priority traffic to wait a shorter time before transmission than a station with low priority traffic. When the client station utilizes time-aligned multi-carrier transmission on the plurality of non-contiguous channels, the same access category may be used for the auxiliary channels as for the principal channel transmission, wherein the contention on auxiliary carriers may depend on the contention rules of the principal carrier. For example, when the client station has high priority traffic to be transmitted on the principal carrier, the traffic transmitted simultaneously on the auxiliary carrier(s) may be considered to be high priority traffic as well, regardless of whether it is actually high priority traffic or not.

When both the network element and the client station support independent transmission on each carrier, communication on each frequency channel may also be independent. Then, the utilization of every channel may be independently (or asynchronous) contention-based according to channel sensing or RTS/CTS principals.

Figure 7:
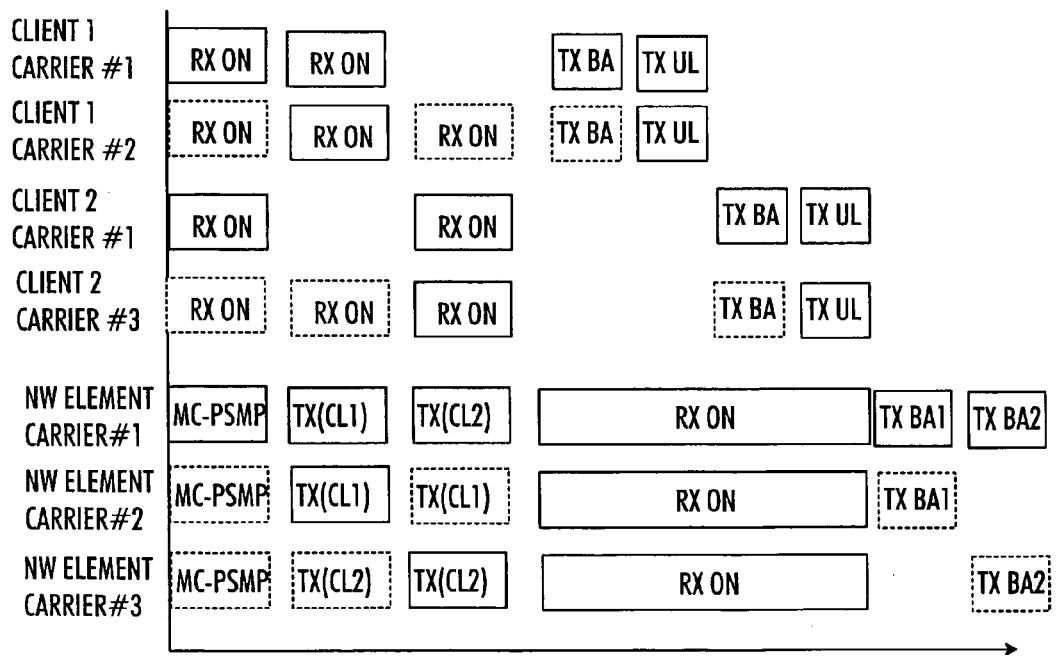
FIG. 7 illustrates scheduled communication according to an embodiment of the invention.

FIG. 7 illustrates an embodiment where the network element schedules the transmission of multiple client stations. In this example, the network element has allocated three non-contiguous carriers for communication but both client stations support transmission on only two carriers. The scheduling may be based on requests the network element receives from the client stations so that the network element knows what type of data traffic each client station is configured to transmit/receive. The scheduling information may be announced to the client stations in the network by using a broadcast or a multicast message, such as a Power Save Multi-Poll (PSMP) frame that includes information on downlink and uplink time allocations for one or more stations in the sets of RF carriers scheduled to be used for the intended duration. In the case of multicarrier scheduling, the network element transmits, during its own transmission opportunity, a schedule to the client stations in the basic service set informing the client stations when to receive downlink data frames and when to begin to transmit uplink data frames. By using a schedule, stations can doze for the maximum amount of time possible without missing frames, as well as be able to be tuned to the particular RF carriers during their respective downlink/uplink transmission times. FIG. 6 illustrates an embodiment of the PSMP sequence which begins with the transmission of a multi-carrier PSMP message from the network element on at least the principal carrier but, optionally, on the auxiliary carriers, too. An identical MC-PSMP message may be transmitted on all channels in order to improve reliability of transmission, or the MC-PSMP message may define scheduling only with respect to the channel where it is transmitted. In yet another embodiment, the MC-PSMP message transmitted only on the principal channel carries scheduling information for all three channels. All the client stations may be configured to receive on the relevant channels (at least on the principal channel) for the MC-PSMP message(s) to obtain the scheduling information.

Now, the network element schedules in the MC-PSMP message(s) a first client station to receive on carriers #1 (principal carrier) and #2 (auxiliary carrier) at a first transmission time interval of a given duration which may be specified in the MC-PSMP message. The second client station may also be scheduled to receive on carrier #3 which is not assigned to the first client station. During this transmission time interval, the network element transmits PDUs to the first client over RF carriers #1 and #2, and it may also transmit to the second client over carrier #3. The PDUs transmitted to the first client station on different carriers may comprise PDUs of the same logical connection, i.e. data of the same access category (real-time, non-real time). At a second transmission time interval, the network element schedules in the MC-PSMP message(s) the second client station to receive on carriers #1 (principal carrier) and #3 (auxiliary carrier). The first client station may also be scheduled to receive on carrier #2, which is not assigned to the second client station. During this transmission time interval, the network element transmits PDUs to the second client over RF carriers #1 and #3, and it may also transmit PDUs to first client station on RF carrier #2.

The next transmission time interval is scheduled for uplink transmissions, which can consist of time for (block) acknowledgment messages followed by uplink data transmission time. The uplink time for the first client station is allocated to the (block) acknowledgment messages from the first client station on at least carrier #1 (principal carrier) but, optionally, on the other carrier #2 as well, if the acknowledgment messages are configured to be transmitted on both carriers. Then, the uplink transmission time interval for the first client station is allocated to transmit uplink PDUs on both of its carriers #1 and #2. At the next two transmission time intervals, the second client station is scheduled to transmit first the (block) acknowledgment messages and then uplink data traffic. During these four transmission time intervals, the network element has the reception active so as to receive the uplink transmissions. At the subsequent transmission time intervals, the network element sends acknowledgment messages for the uplink PDUs first to the first client station and then to the second client station.

In FIG. 7, both client stations are scheduled with equal resources, but the actual amount of resources scheduled to a given client station may depend on the priority of traffic, the other traffic requirements of the client station (requested throughput), channel quality between the client station and the network element, and/or other properties. The scheduling may be applied to all channels or only to some of the channels used in the basic service set, e.g. the auxiliary channels. The other channels may be contention-based, i.e. based on carrier sense multiple access.

In an embodiment, the network element may not have the capability of time scheduling, but it may simply utilize the principal channel for transmitting high priority traffic (access categories 2 and 3 (real-time)), while the auxiliary channels are used for low-priority (non-real time) traffic (access categories 0 and 1). However, high priority traffic may be transmitted on the auxiliary channels as well. The use of auxiliary channels may be based on traffic requirements. Accordingly, the network element may allocate new auxiliary channels or release auxiliary channels on the basis of current traffic requirements. A new auxiliary channel may be allocated by simply configuring the network element to update the beacon information indicating the channels currently used and/or to start to transmit beacon frames on the newly allocated auxiliary channel. An auxiliary channel may be released after communicating channel release management messages between the network element and the client stations currently using the auxiliary channel to be released. In another embodiment, the network element may allocate new auxiliary channels or release auxiliary channels of a given client station on the basis of current traffic requirements of the client station. In this case, the release of the auxiliary channel may be carried out upon communication of channel release messages between the network element and the client station. The allocation of a new auxiliary channel may also be based on communication of channel allocation messages between the network element and the client station, wherein the channel allocation messages identify the new auxiliary channel and comprise handshaking on the newly added auxiliary channel.

Figure 8:
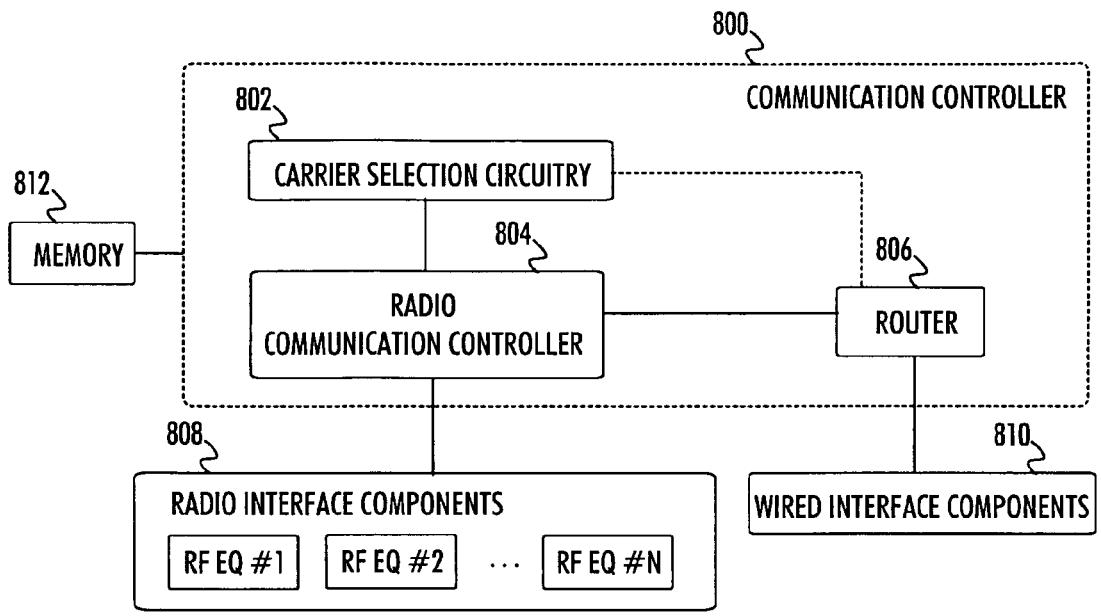
FIGS. 8 and 9 illustrate exemplary structures of apparatuses according to embodiments of the invention.

FIG. 8 illustrates an exemplary structure of an apparatus according to an embodiment of the invention. The apparatus may be applicable to the network element described above and it may comprise at least one processor and at least one memory 812 including a computer program code, wherein the at least one memory and the computer program code are configured, with the at least one processor, to cause the apparatus to carry out the above-described functionalities of the network element. The at least one processor may implement a communication controller 800 controlling the communication-related operation of the network element. As mentioned above, the network element may be the access point of the secondary system. It may be a base station or a router station, and it may operate as a master access point controlling the operation of neighboring slave access points, or it may operate as the slave access point. In an embodiment, the apparatus is the network element comprising the components of FIG. 8 and additional components and functionalities.

Referring to FIG. 8, the apparatus comprises radio interface components 808 providing the apparatus with a capability of operating on multiple non-contiguous frequency bands. The radio interface components 808 may comprise a plurality of logically separate transceiver circuitries (#1 to #N), wherein the number of transceiver circuitries is selected according to the maximum number of non-contiguous frequency bands the network element is desired to support. Each logically separate transceiver circuitry may comprise at least a unique filter and a frequency-converter tuned to a desired frequency channel/carrier. Such components may be tunable to enable the utilization of the same transceiver circuitry for different frequency channels. Different logically separate transceiver circuitries may utilize at least partly the same physical components. For example, the antenna may be common to all transceiver circuitries. Similarly, the same frequency synthesizer may be used, and an oscillator signal provided by the frequency synthesizer may be tuned to different carrier frequencies by using frequency dividers and other frequency-conversion components. The different transceiver circuitries may also use the same physical processor for transmission/reception digital signal processing, e.g. channel estimation, equalization, demodulation, detection, and decoding.

The apparatus may further comprise interface components 810 providing a wired connection to the Internet and to the primary system database (either directly or via another authorized device or node) utilizing the same frequency band as the secondary system according to embodiments of the invention. The interface components may provide the wired connection according to Digital Subscriber Line technology (ADSL, VDSL), Ethernet, or any other wired communication technology. In an alternative embodiment, the network element comprising the apparatus provides the client stations with access to the Internet (and other networks) through a wireless connection, wherein the apparatus routes a wireless connection with the client station to another wireless connection with another network element. Accordingly, the apparatus may support wireless mesh network topology. Then, the wired interface components 810 may be omitted, and the radio interface components may comprise a transceiver circuitry supporting wireless communication capability between two wireless routers.

The apparatus further comprises a router circuitry 806 handling the routing of connections between the wired interface components 810 and the radio communication circuitries 804, 808. The router 806 may be configured to route data traffic between the client stations and other network elements which are not a part of the basic service set, e.g. the Internet. The router 806 may be configured to receive the primary system frequency allocation information through the wired interface components 810 and apply the primary system frequency allocation information to a carrier selection circuitry 802 configured to select the at least two frequency channels on non-contiguous frequency bands for use in the basic service set comprising the network element and client stations communicating with the network element. In another embodiment, the radio interface components carry out channel sensing to determine free frequency channels and to provide the carrier selection circuitry with the result of the channel sensing. The carrier selection circuitry may utilize both database information and the channel sensing results when selecting the frequency channels. The carrier selection circuitry 802 then inputs information on the selected frequency channels to a radio communication controller circuitry 804. The information may contain a frequency channel number and bandwidth information for each selected channel. In response to the received frequency channel information, the radio communication controller circuitry 804 tunes the radio interface components 808 to these frequency bands by controlling frequency converters of the radio interface components to apply corresponding carrier frequencies.

The radio communication controller circuitry 804 may further control the communication on the frequency band. For example, the radio communication controller circuitry 804 may schedule transmissions, as described above with reference to FIG. 7 and, thus, comprise a scheduler circuitry, and/or the radio communication controller circuitry 804 may grant access to the channel (CTS) in response to the reception of an RTS signal. Furthermore, the radio communication controller circuitry 804 carries out data transmission/reception with the client stations. The radio communication controller circuitry 804 may comprise the above-described MAC entity and its functions.

The memory 812 may store the computer programs configuring the operation of the apparatus in connection with at least one processor. Additionally, the memory may store the current frequency channel information and/or the primary system frequency allocation information to enable the carrier selection circuitry to add new channels when needed.

Figure 9:
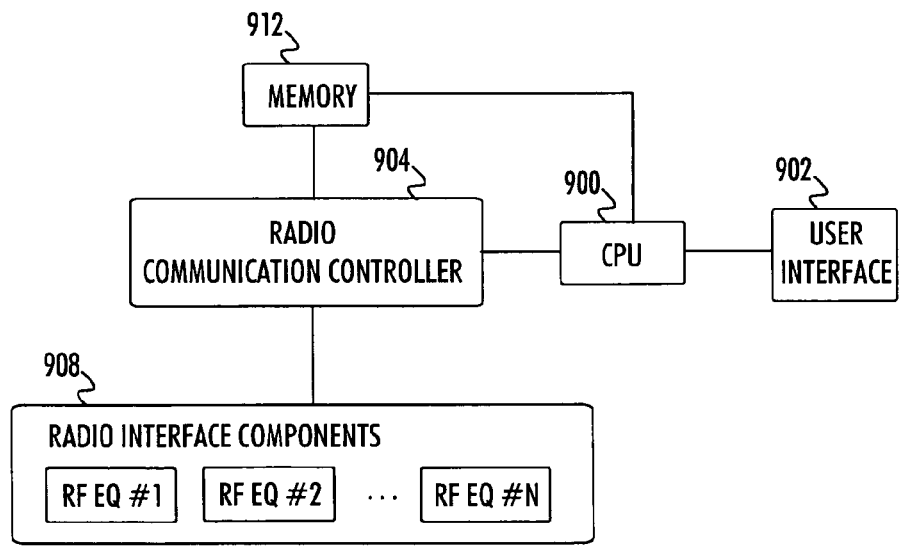

FIG. 9 illustrates an exemplary structure of another apparatus according to an embodiment of the invention. The apparatus of FIG. 9 may be applicable to the client station described above and it may comprise at least one processor and at least one memory 912 including a computer program code, wherein the at least one memory 912 and the computer program code are configured, with the at least one processor, to cause the apparatus to carry out the above-described functionalities of the client station. The at least one processor may implement a radio communication controller circuitry 904 controlling the radio communication-related operation of the client station. The at least one processor may additionally comprise a central processing unit (CPU) 900 controlling the overall operation of the client station according to instructions received from an operating system, computer programs (applications) launched in the client station, peripheral drivers, etc. The client station may be a computer, a portable communication device, a mobile phone, a work station, industrial equipment provided with communication capability, etc. In an embodiment, the apparatus of FIG. 9 is the client station comprising the components of FIG. 9 and additional components and functionalities.

The apparatus of FIG. 9 comprises radio interface components 908 providing the apparatus with a capability of operating on multiple non-contiguous frequency bands. The radio interface components 908 may comprise a plurality of logically separate transceiver circuitries (#1 to #N), wherein the number of transceiver circuitries is selected according to the maximum number of non-contiguous frequency bands the client station is desired to support, preferably at least two. Each logically separate transceiver circuitry may comprise at least a unique filter and a frequency-converter tuned to a desired frequency channel/carrier. Such components may be tunable to enable the utilization of the same transceiver circuitry for different frequency channels. Different logically separate transceiver circuitries may utilize at least partly the same physical components, as was the case with the radio interface components 808 of FIG. 8. The apparatus further comprises a user interface 902 comprising input and output means for interacting with a user of the apparatus. The user interface 902 may comprise a display, a keypad/keyboard or other input means, a microphone, a loudspeaker, a touch-sensitive display, etc. The radio communication controller circuitry 904 is configured to control radio communications with the network element of the same basic service set. In response to the reception of an instruction from the CPU 900 to establish a wireless connection, the radio communication controller circuitry 904 configures the radio interface components 908 to scan for a presence of an access point by scanning through frequency channels supported by the client station. Upon detection of a beacon signal, or in response to reception of a probe response message from the access point, the radio communication controller carries out authentication, network entry, and association procedures and tunes the radio interface components at least to the principal channel of the access point, wherein the principal channel is identified in the received beacon signal and/or probe response. Upon establishment of the connection with the access point, the CPU 900 may establish an Internet protocol (IP) connection with a desired address, wherein the traffic is routed through the connection between the radio communication controller circuitry and the access point. The data transfer may be carried out as described above in connection with any one of FIGS. 4 to 7. The radio communication controller circuitry also exchanges control information with the access point so as to carry out channel reassociation, release, and recovery from channel disconnection.

As used in this application, the term 'circuitry' refers to all of the following: (a) hardware-specific circuit implementations, such as implementations in analog and/or digital circuitry only, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or a portion of a processor and its (or their) accompanying software and/or firmware. The term "circuitry" would also cover, for example and if applicable to the particular element, a baseband integrated circuit or applications processor integrated circuit for a mobile phone or a similar integrated circuit in a server, a cellular network device, or another network device.

As mentioned above, the processes or methods described in connection with FIGS. 2 to 7 may also be carried out in the form of one or more computer processes defined by one or more computer programs. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

Next, let us consider a few embodiments of invention. Referring to FIG. 5A, in an embodiment each MAC PDU is transferred on a single (uplink/downlink) channel (principal channel or auxiliary channel) of the basic service set between the network element and the client station.

In order to facilitate synchronization of the client stations, let us consider a few embodiments. In an embodiment, the location of the principal channel may be fixed with respect to the location of the auxiliary channel(s) in the frequency spectrum, i.e. the client station may determine the location of the principal channel upon discovering an auxiliary channel. In an embodiment, an apparatus applicable to the network element is configured to cause transmission of a message on each radio carrier, the message indicating whether the radio carrier carrying the message is the principal carrier or the auxiliary carrier. In an embodiment, an apparatus applicable to the network element is configured to cause transmission of a message on each radio carrier, the message indicating the frequency channels of the primary system that are free for use in the basic service set of the network element, e.g. the white space channels). Then, an apparatus applicable to the client station is configured to scan only those channels indicated in the message. In an embodiment, the apparatus applicable to the client station is configured to start scanning from a frequency channel that was previously used as the principal channel. In an embodiment, the apparatus applicable to the network element is configured to cause transmission of a beacon signal on different frequency channels with different timing offsets such that the beacon signal is transmitted on different frequency channels at different times to increase the probability of synchronization to at least one channel in the client stations.

In an embodiment, an apparatus applicable to the network element is configured to schedule transmissions in at least one of the channels of the basic service set by transmitting a scheduling message during its own transmission opportunity to the client stations of the basic service set, the scheduling message comprising a schedule informing the client stations when to receive downlink data frames from the network element and when to begin transmitting uplink data frames to the network element. The client stations receiving the scheduling message are configured to transmit and receive data frames according to the schedule.

In an embodiment, the network element and the client station are configured to dedicate the principal channel/carrier for transmitting high priority traffic.

The present invention is applicable to wireless telecommunication systems defined above but also to other suitable wireless telecommunication systems. In particular, many of the techniques and signaling methods described above are also applicable when the network element and client station only utilize a single RF carrier in the network as well. The protocols used, the specifications of wireless telecommunication systems, their network elements and client stations, develop rapidly. Such a development may require extra changes to the described embodiments. Therefore, all words and expressions should be interpreted broadly and they are intended to illustrate, not to restrict, the embodiment. It will be obvious to a person skilled in the art that, as technology advances, the inventive concept may be implemented in various ways. The invention and its embodiments are not limited to the examples described above but may vary within the scope of the claims.

The invention claimed is:

1. A method, comprising:
selecting, in a network element of a wireless network employing dynamic radio carrier allocation, at least two radio carriers on non-contiguous frequency channels for utilization in communication with the network element, wherein each communication with the network element from each station utilizes at least one radio carrier amongst the selected at least two radio carriers;
causing transmission of a signal carrying information about the selected at least two radio carriers on a radio channel;
receiving an association request from a client station, wherein the association request comprises a message indicating a capability of the client station to operate on the selected at least two radio carriers in communication with the network element; and
configuring a communication link between the network element and the client station to utilize at least one radio carrier amongst the selected at least two radio carriers on the non-contiguous frequency channels based on the received association request.

2. The method of claim 1, wherein the selected at least two radio carriers are used in communication within a basic service set, which is a set of all stations that can communicate with the network element, including the network element and the client station, or within an independent basic service set, which is a set of all stations that can communicate with the network element and in which a client station of the independent basic service set functions as the network element.

3. The method of claim 1, further comprising:
defining a principal radio carrier and at least one auxiliary radio carrier amongst the selected at least two radio carriers, wherein the principal radio carrier is configured to transfer more control information than the at least one auxiliary radio carrier;
causing transmission of a downlink signal identifying the principal radio carrier and the at least one auxiliary radio carrier.

4. The method of claim 3, further comprising:
defining a backup principal radio carrier amongst the at least one auxiliary radio carrier for use if a radio channel of the principal radio carrier has to be released;
releasing the principal radio carrier; and
transferring functionality associated with the principal radio carrier to the backup principal radio carrier.

5. The method of claim 1, further comprising:
communicating segmented medium access control packet data units over the selected at least two radio carriers, wherein a first segment of the segmented medium access control packet data units is communicated over a first radio carrier and a second segment of the segmented medium access control packet data units is communicated over a second radio carrier different from the first radio carrier.

6. A method, comprising:
receiving, in a client station from a network element of a wireless network employing dynamic radio carrier allocation, a signal carrying information about at least two radio carriers on non-contiguous frequency channels allocated for communication with the network element;
causing transmission of an association request to the network element, wherein the association request comprises a message indicating capability of the client station to operate on the at least two radio carriers in communication with the network element;
receiving an association response message from the network element, wherein the association response message allocates at least one radio carrier of the at least two radio carriers on the non-contiguous frequency channels for communication between the client station and the network element; and
communicating with the network element on the at least one radio carrier of the at least two radio carriers.

7. The method of claim 6, further comprising: controlling communication through the at least two radio carriers with a common medium access controller.

8. The method of claim 6, further comprising:
communicating segmented medium access control packet data units over the at least two radio carriers, wherein a first segment of the medium access control packet data units is communicated over a first radio carrier and a second segment of the segmented medium access control packet data units is communicated over a second radio carrier different from the first radio carrier.

9. The method of claim 6, further comprising:
communicating at least two packet data units over different radio carriers; and
communicating acknowledgment messages of said at least two packet data units over a same radio carrier.

10. The method of claim 6, wherein the at least two radio carriers comprise a principal radio carrier and at least one auxiliary radio carrier, the principal radio carrier being configured to transfer more control information than the at least one auxiliary radio carrier.

11. The method of claim 1, wherein all stations communicating with the network element utilize in the communication with the network element at least one same radio carrier amongst the at least two radio carriers for at least one of data transfer and data acknowledgment transfer purposes.

12. An apparatus comprising:
at least one processor; and
at least one memory including a computer program code, wherein the at least one memory and the computer program code are configured, with the at least one processor, to cause the apparatus to:
select at least two radio carriers on non-contiguous frequency channels for utilization in communication with a network element of a wireless network employing dynamic radio carrier allocation, wherein each communication with the network element from each station utilizes at least one radio carrier amongst the selected at least two radio carriers;
cause transmission of a signal carrying information about the selected at least two radio carriers on a radio channel;
receive an association request from a client station, wherein the association request comprises a message indicating a capability of the client station to operate on the selected at least two radio carriers in communication with the network element; and
configure a communication link between the network element and the client station to utilize the at least one radio carrier amongst the selected at least two radio carriers on the non-contiguous frequency channels based on the received association request.

13. The apparatus of claim 12, wherein the selected at least two radio carriers are used in communication within a basic service set, which is a set of all stations that can communicate with the network element, including the network element and the client station, or within an independent basic service set, which is a set of all stations that can communicate with the network element and in which a client station of the independent basic service set functions as the network element.

14. The apparatus of claim 12, wherein the at least one memory and the computer program code are configured, with the at least one processor, to cause the apparatus to define a principal radio carrier and at least one auxiliary radio carrier amongst the selected at least two radio carriers, wherein the principal radio carrier is configured to transfer more control information than the at least one auxiliary radio carrier, and to cause transmission of a downlink signal identifying the principal radio carrier and the at least one auxiliary radio carrier.

15. The apparatus of claim 14, wherein the at least one memory and the computer program code are configured, with the at least one processor, to cause the apparatus to define a backup principal radio carrier amongst the at least one auxiliary radio carrier for use if a radio channel of the principal radio carrier has to be released, to release the principal radio carrier, and to transfer functionality associated with the principal radio carrier to the backup principal radio carrier.

16. The apparatus of claim 12, wherein the at least one memory and the computer program code are configured, with the at least one processor, to cause the apparatus to communicate segmented medium access control packet data units over the selected at least two radio carriers, wherein a first segment of the segmented medium access control packet data units is communicated over a first radio carrier and a second segment of the segmented medium access control packet data units is communicated over a second radio carrier different from the first radio carrier.

17. The apparatus of claim 12, wherein the apparatus is an access point of the wireless network configured to provide wireless communication services.

18. An apparatus comprising:
at least one processor; and
at least one memory including a computer program code, wherein the at least one memory and the computer program code are configured, with the at least one processor, to cause the apparatus to:
receive, from a network element of a wireless network employing dynamic radio carrier allocation, a signal carrying information about at least two radio carriers on non-contiguous frequency channels allocated to communication with the network element, wherein each communication with the network element from each station utilizes at least one radio carrier amongst the at least two radio carriers,
cause transmission of an association request to the network element, wherein the association request comprises a message capability of the apparatus to operate on the at least two radio carriers in communication with the network element,
receive an association response message from the network element, wherein the association response message allocates at least one radio carrier amongst the at least two radio carriers on non-contiguous frequency channels for communication between the apparatus and the network element.

19. The apparatus of claim 18, wherein the at least one memory and the computer program code are configured, with the at least one processor, to cause the apparatus to control communication through the at least two radio carriers with a common medium access controller.

20. The apparatus of claim 18, wherein the at least one memory and the computer program code are configured, with the at least one processor, to cause the apparatus to communicate segmented medium access control packet data units over the at least two radio carriers, wherein a first segment of the segmented medium access control packet data units is communicated over a first radio carrier and a second segment of the segmented medium access control packet data units is communicated over a second radio carrier different from the first radio carrier.

21. The apparatus of claim 18, wherein the at least one memory and the computer program code are configured, with the at least one processor, to cause the apparatus to communicate at least two packet data units over different radio carriers, and to communicate acknowledgment messages of said at least two packet data units over a same radio carrier.

22. The apparatus of claim 18, wherein the at least two radio carriers comprise a principal radio carrier and at least one auxiliary radio carrier, the principal radio carrier being configured to transfer more control information than the at least one auxiliary radio carrier.

23. The apparatus of claim 18, wherein the apparatus is a terminal device of the wireless network.

* * * * *